United States Patent
Kim (10) Patent No.: US 10,432,246 B2
(45) Date of Patent: Oct. 1, 2019

(54) CASE HAVING STORAGE COMPARTMENT FOR ELECTRONIC DEVICES

(71) Applicant: SPIGEN KOREA CO., LTD., Seoul (KR)

(72) Inventor: Dae-Young Kim, Seoul (KR)

(73) Assignee: SPIGEN KOREA CO., LTD., Seoul (KR)

( * ) Notice: Subject to any disclaimer, the term of this patent is extended or adjusted under 35 U.S.C. 154(b) by 0 days.

(21) Appl. No.: 15/221,403

(22) Filed: Jul. 27, 2016

(65) Prior Publication Data

US 2017/0033826 A1 Feb. 2, 2017

Related U.S. Application Data

(60) Provisional application No. 62/197,511, filed on Jul. 27, 2015.

(51) Int. Cl.
*H04B 1/3888* (2015.01)
*A45C 11/00* (2006.01)
*A45C 13/00* (2006.01)
*A45C 13/02* (2006.01)

(52) U.S. Cl.
CPC .......... *H04B 1/3888* (2013.01); *A45C 11/00* (2013.01); *A45C 13/002* (2013.01); *A45C 2011/002* (2013.01); *A45C 2011/003* (2013.01); *A45C 2013/026* (2013.01)

(58) Field of Classification Search
CPC .............. A45C 2011/002; A45C 11/00; A45C 2011/003; A45C 13/002; G06F 1/1628; H04B 1/3888
See application file for complete search history.

(56) References Cited

U.S. PATENT DOCUMENTS

| 8,047,364 | B2 | 11/2011 | Longinotti-Buitoni |
| 8,245,842 | B2 | 8/2012 | Bau |
| 8,439,191 | B1 | 5/2013 | Lu |
| 8,833,379 | B1 | 9/2014 | Kaplan |

(Continued)

FOREIGN PATENT DOCUMENTS

| GB | 2498447 A | 7/2013 |
| KR | 20-0472435 Y1 | 4/2014 |
| KR | 10-2014-0071584 A | 6/2014 |

OTHER PUBLICATIONS

Spigen. ("The Slim Armor CS for Galaxy S5" [retrieved from https://www.youtube.com/watch?v=sFnk4-tzbQo], YouTube.com [online], Jul. 22, 2014 [retrieved Sep. 17, 2017], (See attached screen shots and audio transcript of published video)).*

(Continued)

*Primary Examiner* — Margaret G Mastrodonato
(74) *Attorney, Agent, or Firm* — Heedong Chae; Lucem, PC (57) ABSTRACT

A case, having a storage compartment, for an electronic device includes a soft protective case, a hard protective frame, and a cover. The soft protective case includes an aperture and the hard protective frame includes the storage compartment such that the aperture of the soft protective case is constructed to receive the storage compartment therein. The storage compartment of the hard protective frame fits in the aperture of the soft protective case and sides of the aperture of the soft protective case substantially surround the side walls of the storage compartment.

19 Claims, 7 Drawing Sheets

(56) References Cited

U.S. PATENT DOCUMENTS

| | | | |
|---|---|---|---|
| 9,049,283 B1 | 6/2015 | Kim | |
| 9,161,597 B2 | 10/2015 | Kay et al. | |
| 9,241,551 B2 | 1/2016 | Lawson et al. | |
| 2010/0230301 A1 | 9/2010 | Fellig | |
| 2011/0053659 A1 | 3/2011 | Murphy | |
| 2011/0294556 A1 | 12/2011 | Carlberg et al. | |
| 2012/0021810 A1 | 1/2012 | Terry | |
| 2012/0067751 A1* | 3/2012 | Mongan | A45C 11/00 206/216 |
| 2012/0147536 A1 | 6/2012 | Sa | |
| 2012/0244918 A1 | 9/2012 | Hall | |
| 2013/0095898 A1 | 4/2013 | Altschul et al. | |
| 2013/0157730 A1 | 6/2013 | McCormac et al. | |
| 2014/0034531 A1 | 2/2014 | Wang | |
| 2014/0051488 A1 | 2/2014 | Chung | |
| 2014/0066142 A1 | 3/2014 | Gipson | |
| 2014/0251368 A1* | 9/2014 | Lawson | A45C 11/00 132/287 |
| 2015/0365122 A1* | 12/2015 | Kim | H04M 1/21 455/575.8 |
| 2016/0113368 A1* | 4/2016 | Tu | H04B 1/3888 206/45.23 |

OTHER PUBLICATIONS

Nick Guy, "Review: Incipio Stowaway for iPhone 4/4S", http://www.ilounge.com/index.php/reviews/entry/incipio-stowaway-for-iphone-4-4s, published on Dec. 5, 2011.

* cited by examiner

CASE HAVING STORAGE COMPARTMENT FOR ELECTRONIC DEVICES

CROSS-REFERENCE TO RELATED APPLICATIONS

This application claims priority to U.S. provisional patent application No. 62/197,511 filed Jul. 27, 2015, which is incorporated herein by reference.

FIELD OF THE INVENTION

The present invention relates to a case having, a storage compartment, for an electronic device and, more particularly, to a mobile phone case having three main members of a soft protective case, a hard protective frame and a cover. The hard protective frame may be constructed to removably mount over the soft protective case, or be fixedly attached to the soft protective case by a process like over-molding or two-shot molding. The cover is configured to slidably open and close the storage compartment which stores personal items such as a credit card, debit card, gift card or identification card. The cover may slidably or rotatably open and close the storage compartment.

BACKGROUND OF THE INVENTION

Portable electronic devices, such as mobile phones, smart phones, tablet computers or the like, have become popular and widely used for communication, entertainment purposes and other purposes. These electronic devices are intended to be carried or moved about and as such, these devices are more likely to be accidentally dropped, hit, or scratched. To protect the portable electronic devices, protective cases have been introduced and become popular in connection with the electronic devices such as cell phones, smart phones, tablet computers and the like.

There has been a trend towards combining several functions into the protective cases, for example, a case having a pocket or purse clutter integrated therein. Among many types of cases, flip/folio-style cases have become popular to have a storage space to store credit/debit cards. A cover flip opens and closes over an electronic device such as a mobile phone or a smart phone. Such cover usually has a securing mechanism such as a snap, a magnet, or hook and loop fasteners. Credit cards are usually stored inside the front cover of the case. In order to use the electronic device, the cover must be opened, thereby exposing the front of the device and the credit cards together. Thus, whenever a user uses the electronic device, the credit cards are exposed as well.

Besides, the sizes and shapes of modern cell phones have become much more compact than those in the past, and accordingly, the cases have become compact as well. However, adding a storage space for personal items such as a credit card tends to make the cases unnecessarily bulkier and heavier.

Therefore, to solve the above problems and facilitate convenient carrying of personal items such as credit/debit cards, there is a need for a case for an electronic device having a compact, stylish and integrated structure for a storage compartment to store personal items such as a credit/debit card(s). This invention is directed to solve these problems and satisfy the long-felt need.

SUMMARY OF THE INVENTION

The present invention contrives to solve the disadvantages of the prior art. The present invention provides a case, having a storage compartment, for an electronic device and, more particularly, to a mobile phone case having three main members of a soft protective case, a hard protective frame and a cover. The hard protective frame may be constructed to removably meant over the soft protective case, or be fixedly attached to the soft protective case. The cover is constructed to slidably open and close the storage compartment which stores personal items such as a credit card, debit card, gift card or identification card. The cover may slidably or rotatably open and close the storage compartment.

U.S. patent application Ser. No. 14/693,805, titled "Case Having a Storage Compartment for Electronic Devices" filed on Apr. 22, 2015 discloses a case having a credit card storage compartment and disclosure of the application is hereby expressly incorporated by reference in its entirety. U.S. patent application Ser. No. 14/693,805 is a continuation of U.S. patent application Ser. No. 14/562,621 filed on Dec. 5, 2014 which claims priority to U.S. provisional patent application No. 62/012,962 filed Jun. 16, 2014, each earlier application hereby expressly incorporated by reference herein in their entirety.

The object of the invention is to provide a case, having a storage compartment, for an electronic device which includes a soft protective case, a hard protective frame, and a cover. The soft protective case comprises an aperture and the hard protective frame comprises the storage compartment such that the aperture of the soft protective case is constructed to receive the storage compartment therein. The storage compartment of the hard protective frame fits in the aperture of the soft protective case. The sides of the aperture of the soft protective case substantially surround the side walls of the storage compartment.

Another object of the invention is to provide a case, having a storage compartment, for an electronic device which includes a soft protective case, a hard protective frame, and a cover. An opening is formed on a side wall of the storage compartment and a protrusion is formed on the soft protective case. The protrusion of the soft protective case is constructed to pass through the opening of the storage compartment for securely holding a card stored in the storage compartment by pressing the card on its side.

The advantages of the present invention are: (1) the case having a storage compartment of the present invention well protects an item such as a debit/credit card stored in the storage compartment; (2) the case of the present invention has one compact, stylish, and integrated structure; (3) the credit card stored in the storage compartment is not easily visible to others; and (4) a debit/credit card is well retained by the protrusion of the soft protective case and thus, there is no rattling sound made by the debit/credit card hitting against the storage compartment.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions of parameters described and/or shown herein, and that the terminology used herein is for the purpose of describing particular embodiments by way of example only and is riot intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1A:
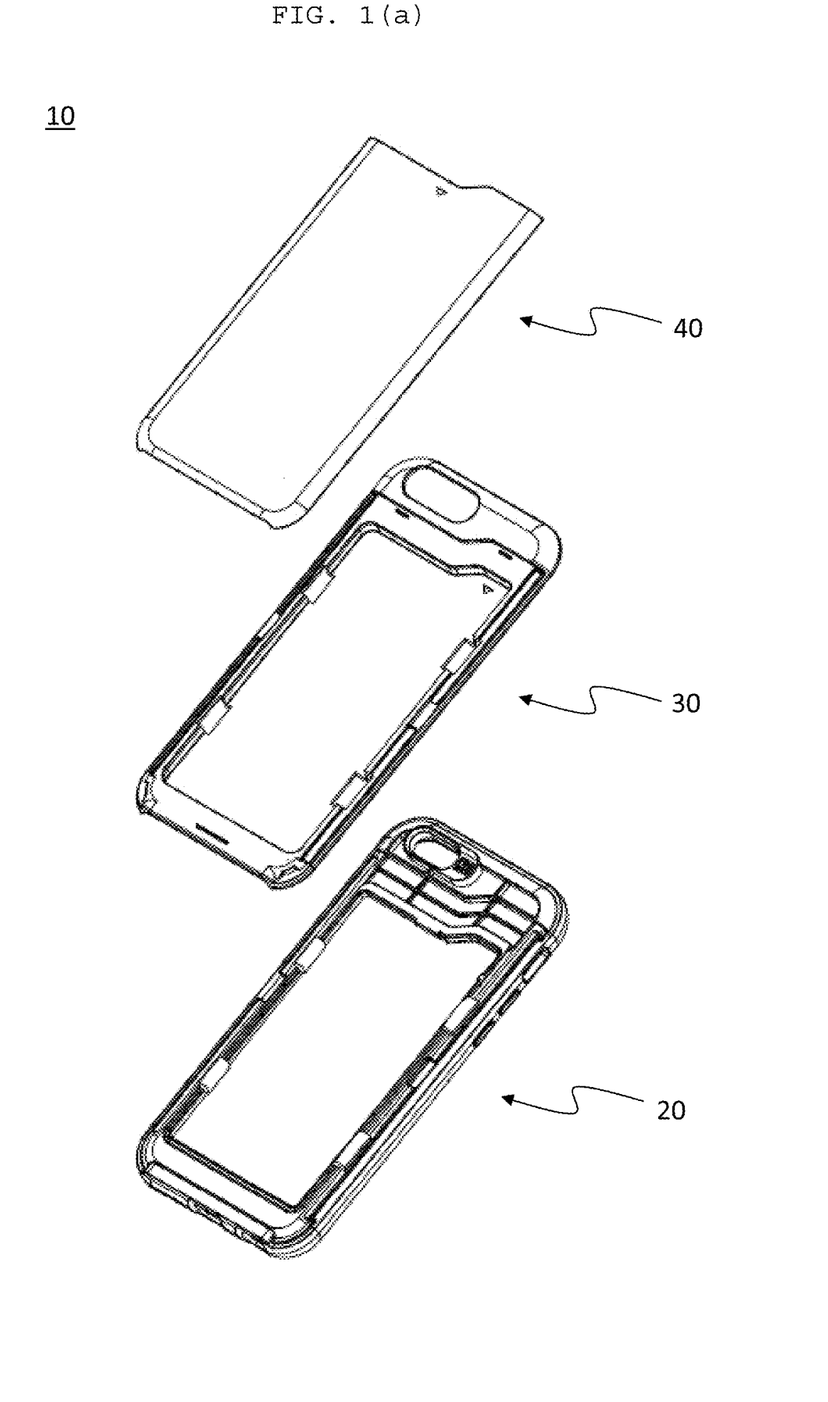
FIG. 1(a) shows an exploded perspective view of a case having a storage compartment, which is comprised of a soft protective case, a hard protective frame, and a cover.
Figure 1B:
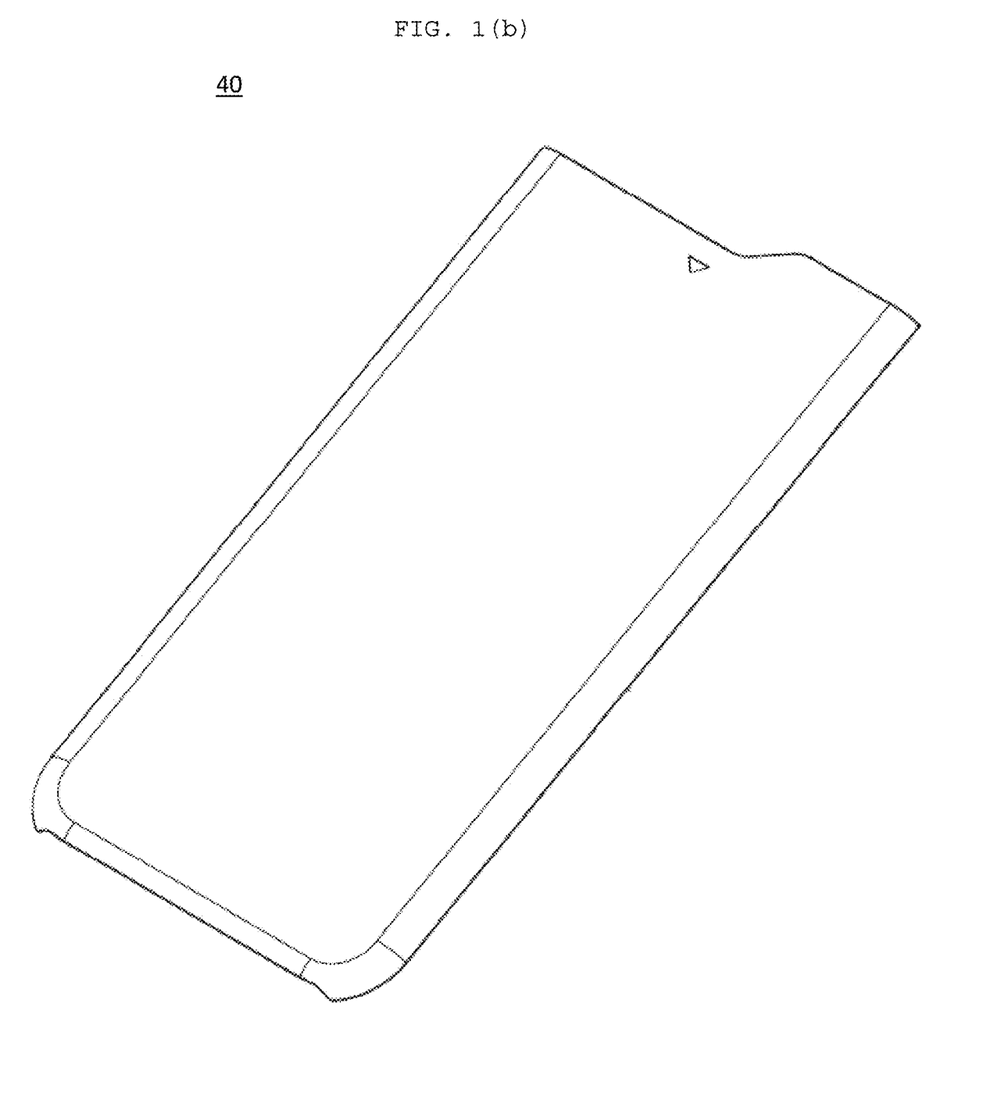
FIG. 1(b) shows a perspective view of the cover.
Figure 1C:
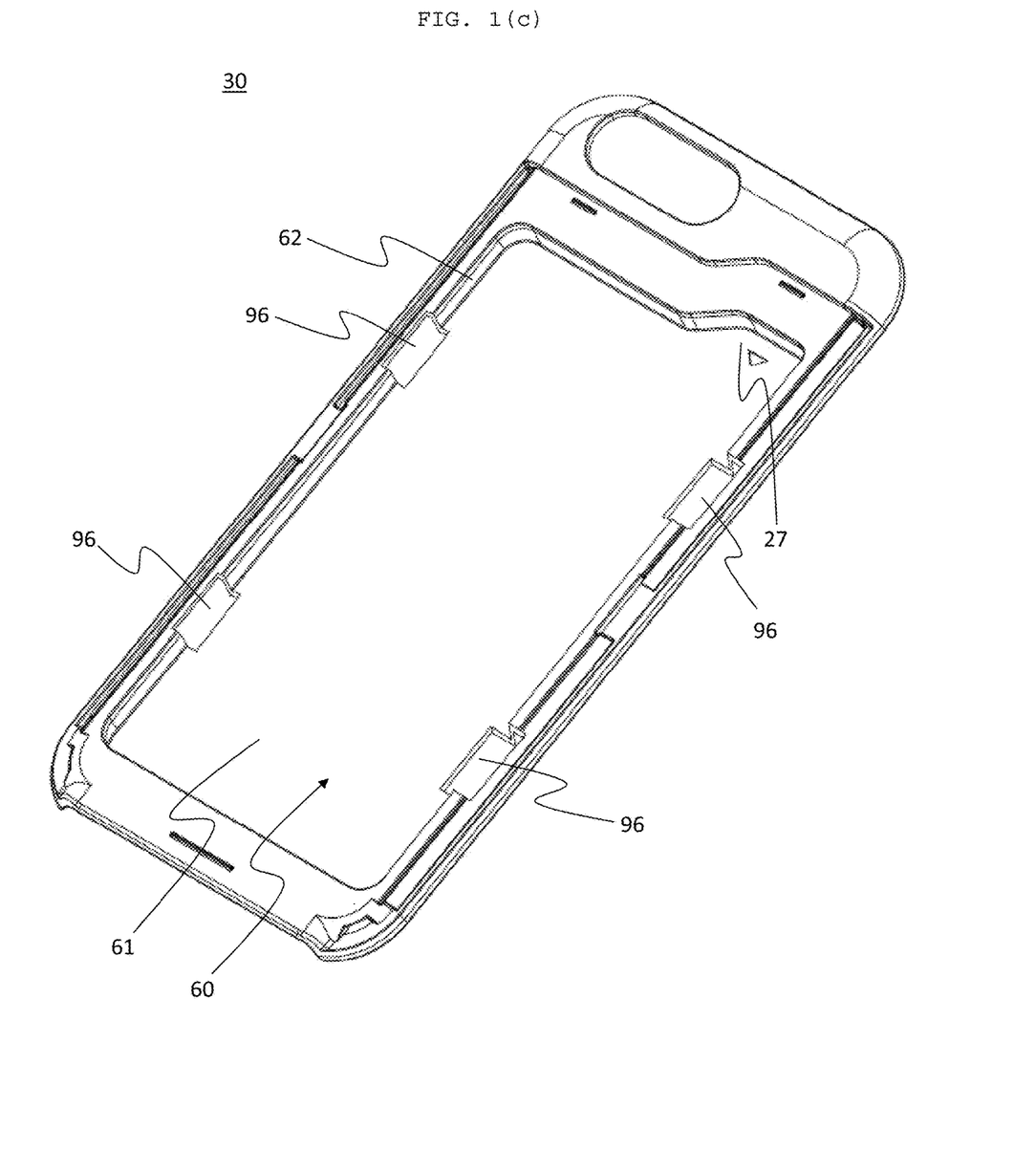
FIG. 1(c) shows a perspective view of the hard protective frame having a storage compartment.
Figure 1D:
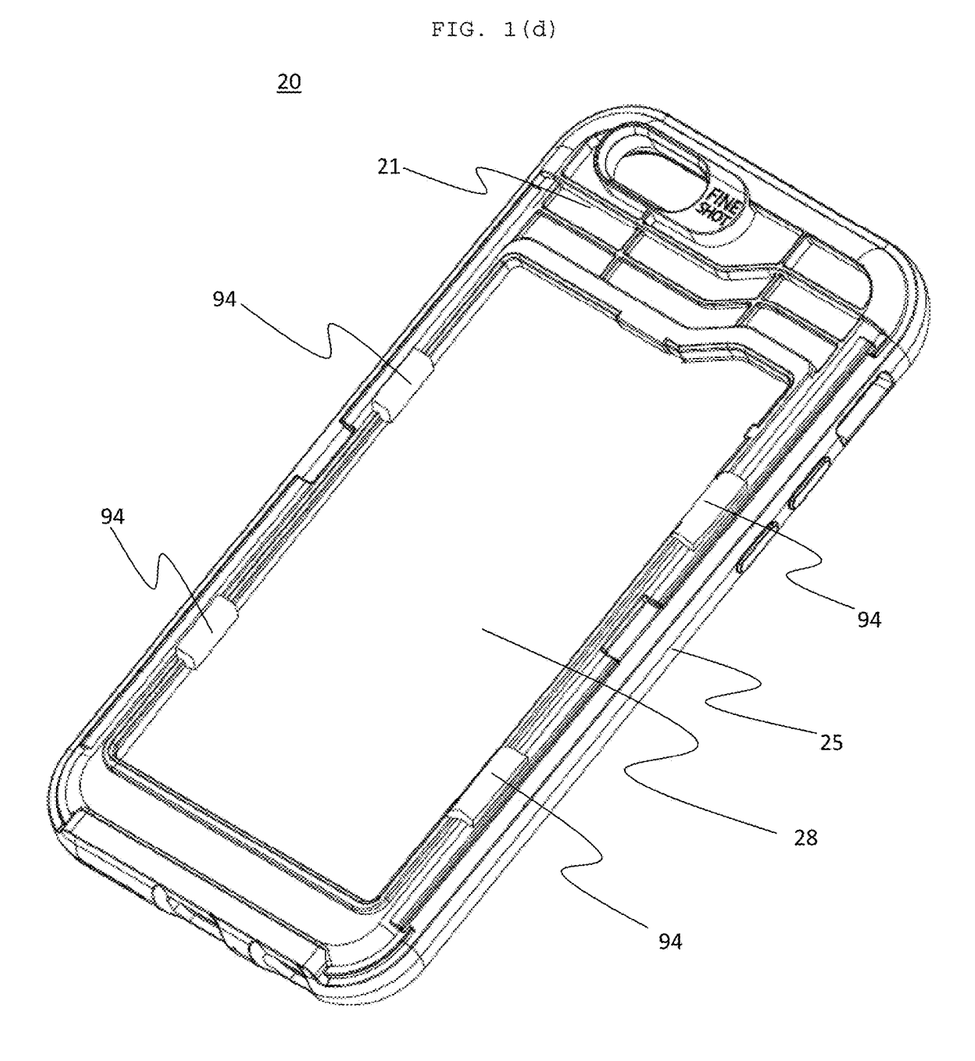
FIG. 1(d) shows a perspective view of the soft protective case.

FIG. 1(a) shows an exploded perspective view of a case 10 having a storage compartment 60, which is comprised of a soft protective case 20, a hard protective frame 30, and a cover 40. FIGS. 1(b), 1(c) and 1(d) respectively shows perspective views of the cover 40, the hard protective frame 30, and the soft protective case 20.

Figure 2A:
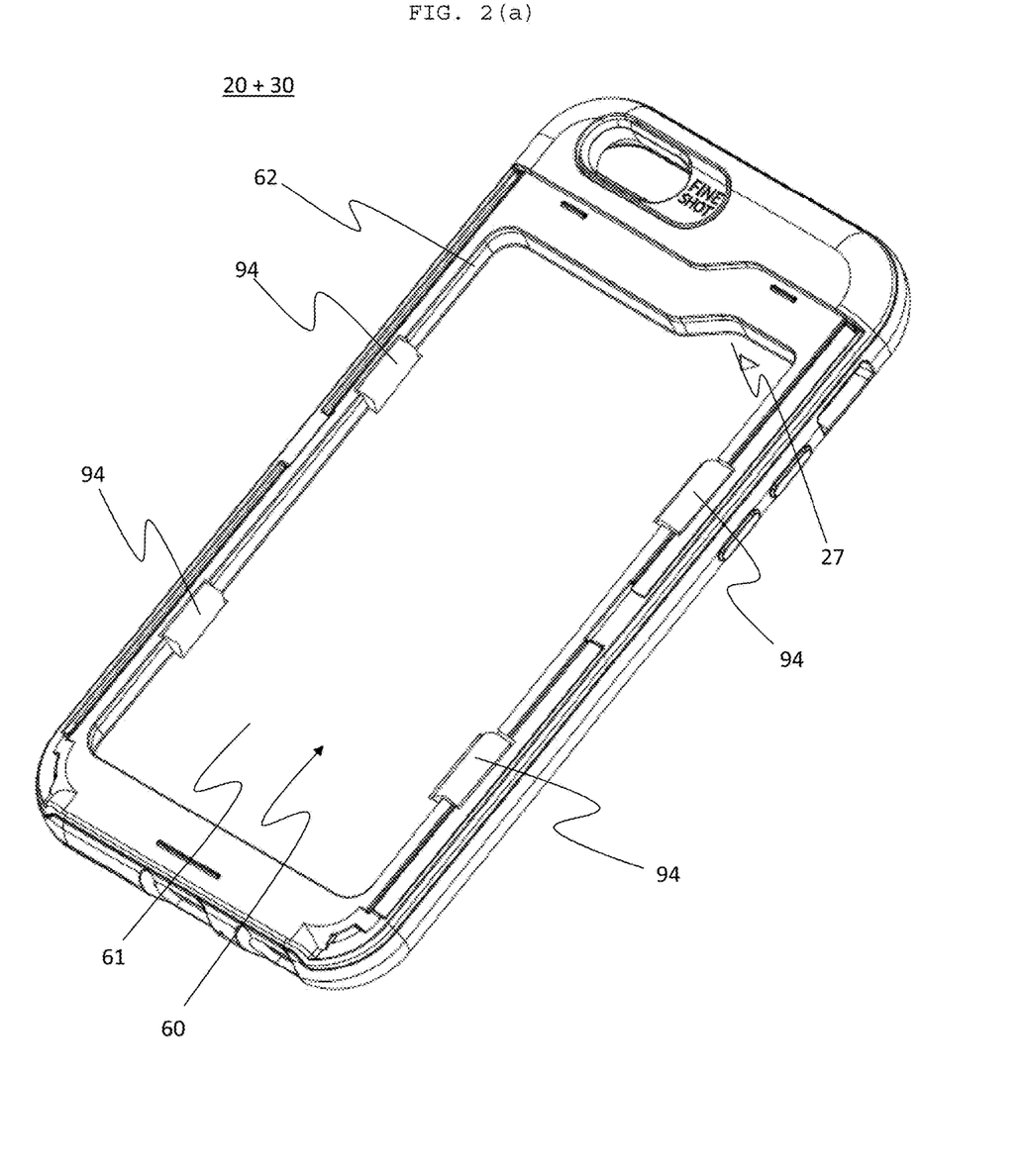
FIG. 2(a) shows a perspective view of the soft protective case and hard protective frame assembled together.
Figure 2B:
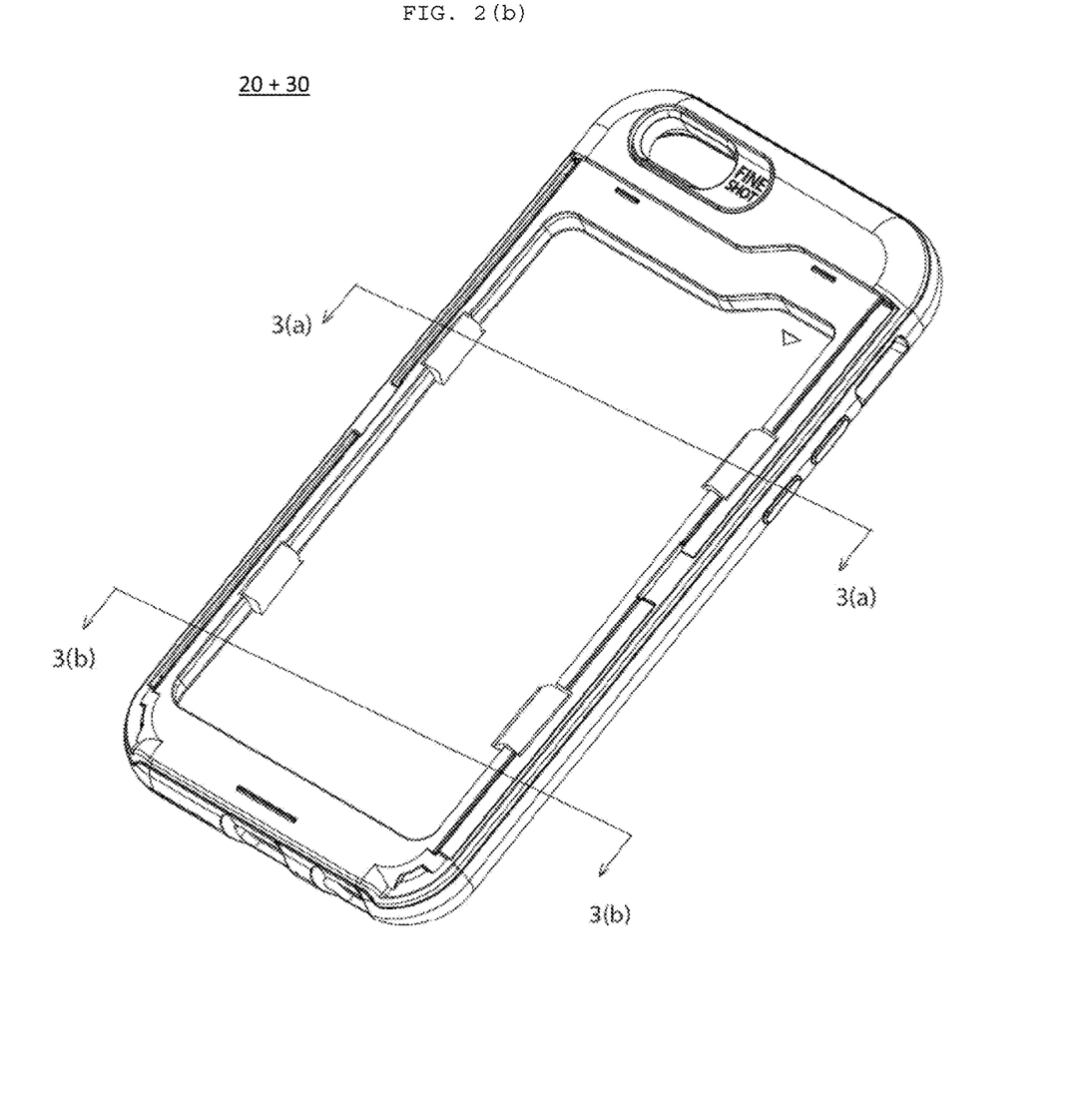
FIG. 2(b) shows another perspective view of the soft protective case and hard protective frame assembled together, illustrating locations of sectional views for FIGS. 3(a) and 3(b)
Figure 3A:
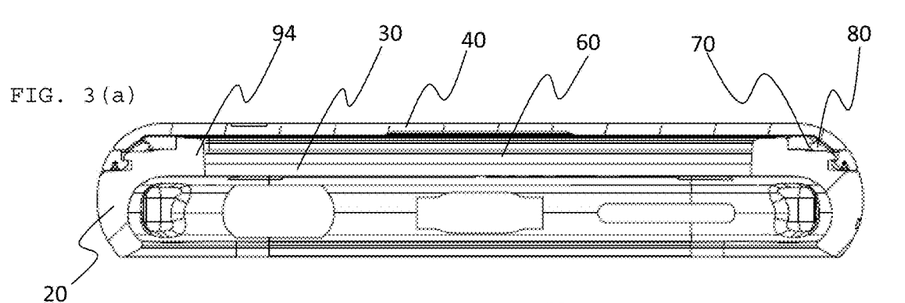
FIG. 3(a) shows a cross-sectional view of the soft protective case and hard protective frame assembled together.
Figure 3B:
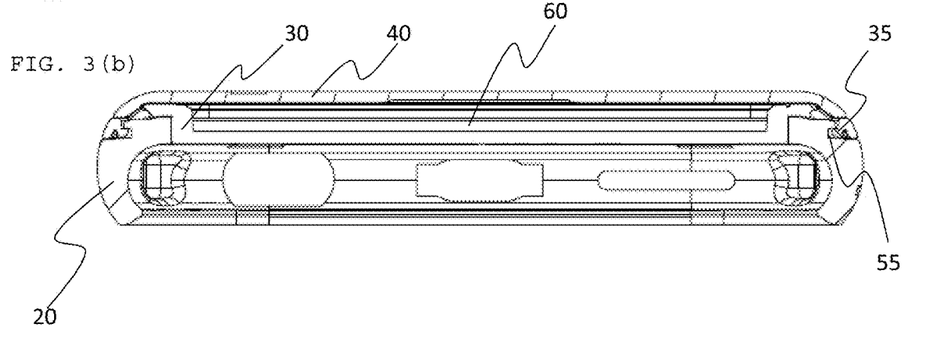
FIG. 3(b) shows another cross-sectional view of the soft protective case and hard protective frame assembled together.

FIGS. 2(a) and 2(b) show perspective views of the soft protective case 20 and the hard protective frame 30 assembled together. FIGS. 3(a) and 3(b) show cross-sectional views of the soft protective case 20 and hard protective frame 30 assembled together.

The case 10, having a storage compartment 60, for an electronic device 100, comprises: a soft protective case 20 which comprises a back panel 21 to cover at least a portion of a back portion of the electronic device 100 (not shown), and a side wall 25 extending from a top surface of the back panel along edges of the back panel 21 to cover side portion of the electronic device 100 wherein the soft protective case 20 comprises an aperture 28; a hard protective frame 30, constructed to removably mount over the soft protective case 20, wherein the hard protective frame 30 comprises the storage compartment 60; and a cover 40 for opening and closing the storage compartment 60. The aperture 28 of the soft protective case 20 is constructed to receive the storage compartment 60 therein. For an electronic device, the side having a screen is a front portion and the other side is the back portion of the electronic device. The soft protective case 20 is constructed to cover at least a portion of the back portion and side portions of the electronic device.

The electronic device 100 may be a mobile phone, a cell phone, PDA, a smart phone, tablet computer, etc.

The storage compartment 60 comprises a bottom surface 61 and side walls 62. In addition, the bottom surface 61 of the storage compartment 60 covers at least a portion of the back portion of the electronic device 100 (not shown). Preferably, the bottom surface 61 of the storage compartment 60 is in contact with the back portion of the electronic device 100 received in the soft protective case 20.

Items that can be stored in the storage compartment 60 include credit cards, payment cards, identification cards (e.g., driver's license, membership card, etc.), business cards, coupons, receipts, gift cards, or the like.

As shown in FIG. 1(c), an opening 96 is formed on the side wall 62 of the storage compartment 60 and a protrusion 94 is formed on the soft protective case 20 such that the protrusion 94 of the soft protective case 20 is constructed to pass through the opening 96 of the storage compartment 60 for securely holding a card (not shown) stored in the storage compartment 60. The protrusion 94 is protruded to the direction of a debit/credit card stored in the storage compartment 60. When the card is stored in the storage compartment 60, the protrusion 94 holds the card in place by pressing the card from its side.

Preferably, there are two openings 96 of the storage compartment 60 and two protrusions 94 of the soft protective case 20 such that as shown in FIG. 1(c), the two openings 96 are formed on opposite side walls 62 of the storage compartment 60. The two protrusions 94 respectively pass through the two openings 96 for securely holding opposite sides of the card stored in the storage compartment 60.

More preferably, there are four openings 96 of the storage compartment 60 and four protrusions 94 of the soft protective case 20 such that the four openings 96 are formed on opposite side walls of the storage compartment as in FIG. 1(c). The four protrusions 94 respectively pass through the four openings 56 for securely holding opposite sides of the card stored in the storage compartment 60.

The main purpose of the protrusions 94 is to hold a card stored in the storage compartment 60, but it also provides better coupling between the soft protective case 20 and the hard protective frame 30.

The opening 96 is formed not just on the side wall 62 of the storage compartment 60, but also partially on the bottom surface 61 of the storage compartment 60. The protrusion 94 of the soft protective case 20 is constructed to snugly fit in the opening 96 of the storage compartment 60. In the alternative, as shown in FIG. 1(c), the opening 96 may be formed on the side wall 62, partially on the bottom surface 61, and partially on top of the side wall 62. The protrusion 94 of the soft protective case 20 is preferably constructed to snugly fit in all boundaries of the opening 96 of the storage compartment 60 and top side of the protrusion 94 may be flush with the top of the side wall 62 as shown in cross-sectional view of FIG. 3(a). The top side of the protrusion 94 may be in contact with the cover 40 as in FIG. 3(a).

The cover 40 as a whole may be constructed to be a structure complementary to the shape of the hard protective frame 30 so that the cover 40 looks like a cut-out from the hard protective frame 30. Accordingly, the cover 40 and the hard protective frame 30 have continuous outer contours that the case 10 does not appear to have a card storage compartment 60. The top side of the protrusion 94 may be in contact with the cover 40 as in FIG. 3(a), and such contact may provide friction to the sliding cover. By adjusting the friction, the cover can be made sliding well enough, but not easily open.

The drawings disclose opening 96 and protrusion 94, but they are only examples and the present invention is not limited to such examples. The protrusion 94 and opening 96 can be in various shapes or constructions as long as the protrusion(s) 94 securely holds a card stored in the storage compartment 60.

The storage compartment 60 of the hard protective frame 30 fits in the aperture 28 of the soft protective case 20. Furthermore, sides of the aperture 28 of the soft protective 20 case may substantially surround the side walls 62 of the storage compartment 60.

The cover 40 slides forward and backward with respect to the hard protective frame 30. The case 30 further comprises a sliding means for sliding the cover forward and backward with respect to the hard protective frame 30.

The sliding means may comprise a pair of rails 80 formed on the cover 40 and a pair of rail guides 70 formed on the hard protective frame 30 wherein the rails 80 are configured to slide forward and backward along the rail guides 70. U.S. patent application Ser. No. 14/693,805 discloses such sliding means the contents of which are incorporated herein. Rail guides 70 can be made in various shapes or constructions— they may be a groove (U-shaped, V-shaped or L-shaped (step structure groove)), channel or cut. The rail guides 70 may be formed on the hard protective frame 30 alone or on both of the hard protective frame 30 and the soft protective case 20 as shown in FIG. 3(a).

Alternatively, the cover 40 may be a door for rotatably opening and closing the storage compartment 60.

The cover 40 as a whole may be configured to be a structure complementary to the shape of the hard protective frame 30 so that the cover 40 looks like a cut-out from the hard protective frame 30.

The storage compartment 60 is sized and constructed to receive a card therein. The card includes a debit/credit card, gift card and identification card.

The soft protective cover 20 is made of soft material and the hard protective frame 30 and the cover 40 are made of hard material. Preferably, the soft protective cover 20 is made of thermoplastic polyurethane and the hard protective frame 30 and the cover 40 are made of polycarbonate.

The storage compartment 60 may further comprise a recessed area 27 for easy access to a card stored in the storage compartment 60.

The soft protective case 20 comprises a longitudinal recess 55 and the hard protective frame 30 comprises a longitudinal protrusion 35 such that the longitudinal recess 55 of the soft protective case 20 receives the longitudinal protrusion 35 of the hard protective frame 30 therein for secure coupling between the soft protective case 20 and the hard protective frame 30.

Width and length of the storage compartment 60 are respectively substantially same or slightly greater than those of a debit/credit card so that the debit/credit card can snugly fit in the storage compartment 60.

The soft protective case 20 is sufficiently flexible to accept insertion of the electronic device 100 therein and sufficiently rigid to securely retain the inserted electronic device 100.

In the alternative embodiment of the present invention, the hard protective frame 30 may be fixedly attached to the soft protective case 20 by a manufacturing process such as over-molding or two-shot injection molding.

The case 10, having a storage compartment 60, for an electronic device 100, comprises: a soft protective case 20 which comprises a back panel 21 to cover at least a portion of a back portion of the electronic device 100, and a side wall 25 extending from a top surface of the back panel along edges of the back panel 21 to cover side portions of the electronic device 100 wherein the soft protective case 20 comprises an aperture 28; a hard protective frame 30, fixedly attached to the soft protective case 20, wherein the hard protective frame 30 comprises the storage compartment 60; and a cover 40 for opening and closing the storage compartment 60. The aperture 28 of the soft protective case 20 is constructed to receive the storage compartment 60 therein. The hard protective frame 30 is fixedly attached to the soft protective case 20 by an attachment means such as adhesive, glue, or the like. Alternatively, the hard protective frame 30 is fixedly attached to the soft protective case 20 by a manufacturing process such as over-molding or two-shot injection molding.

The storage compartment 60 comprises a bottom surface 61 and side walls 62. The bottom surface 61 of the storage compartment 60 covers at least a portion of the back portion of the electronic device 100.

As shown in FIG. 1(c), an opening 96 is formed on the side wall 62 of the storage compartment 60 and a protrusion 94 is formed on the soft protective case 20, wherein the protrusion 94 of the soft protective case 20 is constructed to pass through the opening 96 of the storage compartment 60 for securely holding a card stored in the storage compartment 60.

In one embodiment, there are two openings 96 of the storage compartment 60 and two protrusions 94 of the soft protective case 20 wherein the two openings 96 are formed on opposite side walls 62 of the storage compartment 60, and wherein the two protrusions 94 respectively pass through the two openings 96 for securely holding opposite sides of the card stored in the storage compartment 60.

In another embodiment, there are four openings 96 of the storage compartment 60 and four protrusions 94 of the soft protective case 20 wherein the four openings 96 are formed on opposite side walls 62 of the storage compartment 60, and wherein the four protrusions 94 respectively pass through the four openings 96 for securely holding opposite sides of the card stored in the storage compartment 60.

The opening 96 is formed not just on the side wall 62 of the storage compartment 60, but also partially on the bottom surface 61 of the storage compartment 60, wherein the protrusion 94 of the soft protective case 20 is constructed to snugly fit in the opening 96 of the storage compartment 60.

The storage compartment 60 of the hard protective frame 30 fits in the aperture 26 of the soft protective case 20. In the alternative, as shown in FIG. 1(c), the opening 96 may be formed on the side wall 62, partially on the bottom surface 61, and partially on top of the side wall 62. The protrusion 94 of the soft protective case 20 is preferably constructed to snugly fit in all boundaries of the opening 96 of the storage compartment 60 and top side of the protrusion 94 may be flush with the top of the side wall 62 as shown in cross-sectional view of FIG. 3(a). The top side of the protrusion 94 may be in contact with the cover 40 as in FIG. 3(a).

The cover 40 as a whole may be constructed to be a structure complementary to the shape of the hard protective frame 30 so that the cover 40 looks like a cut-out from the hard protective frame 30. Accordingly, the cover 40 and the hard protective frame 30 have continuous outer contours that the case 10 does not appear to have a card storage compartment 60. The top side of the protrusion 94 may be in contact with the cover 40 as in FIG. 3(a), and such contact may provide friction to the sliding cover. By adjusting the friction, the cover can be made sliding well enough, but not easily open.

The drawings disclose only examples of such opening 96 and protrusion 94, and the present invention is not limited to such examples. The protrusion 94 and opening 96 can be in various shapes or constructions as long as the protrusion 94 securely holds a card stored in the storage compartment 60.

Sides of the aperture 28 of the soft protective case substantially surround the side walls 62 of the storage compartment 60.

The cover 40 slides forward and backward with respect to the hard protective frame 30. The case 10 may further comprise a sliding means for sliding the cover 40 forward and backward with respect to the hard protective frame 30.

The sliding means comprises a pair of rails 80 formed on the cover 40 and a pair of rail guides 70 formed on the hard protective frame 30 wherein the rails 80 are configured to slide forward and backward along the rail guides 70.

Alternatively, the cover 40 may be a door for rotatably opening and closing the storage compartment 60.

The storage compartment 60 is sized and configured to receive a card therein wherein the card includes a debit/credit card, gift card and identification card.

The soft protective cover 20 is made of soft material and the hard protective frame 30 and the cover 40 are made of hard material. More preferably, the soft protective cover 20 is made of thermoplastic polyurethane and the hard protective frame 30 and the cover 40 are made of polycarbonate.

The storage compartment 60 may further comprise a recessed area 27 for easy access to a card stored in the storage compartment 60.

The hard protective frame 30 is fixedly attached to the soft protective case 20 by an attachment means or glue.

Width and length of the storage compartment 60 are respectively substantially same or slightly greater than those of a credit card so that the credit card can snugly fit in the storage compartment 60.

The soft protective case 20 is sufficiently flexible to accept insertion of the electronic device 100 therein and sufficiently rigid to securely retain the inserted electronic device 100.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A case, having a storage compartment, for an electronic device, comprising:
    a soft protective case which comprises:
        a back panel to cover at least a portion of a back portion of the electronic device and
        a side wall extending from a front side of the back panel along edges of the back panel to cover side portions of the electronic device, wherein the soft protective case comprises an aperture;
    a hard protective frame removably mounted over the soft protective case and comprising the storage compartment, the storage compartment defined by a hard bottom surface proximate to the back portion of the electronic device and a hard side wall extending rearwardly from the hard bottom surface; and
    a cover opposite the hard bottom surface for opening and closing the storage compartment,
wherein the aperture of the soft protective case is constructed to receive the storage compartment of the hard protective frame therein.

2. The case of claim 1, wherein the hard bottom surface of the storage compartment covers at least a portion of the back portion of the electronic device.

3. The case of claim 1, wherein an opening is formed on the side wall of the storage compartment and a protrusion is formed on the aperture of the soft protective case, wherein the protrusion of the soft protective case is constructed to pass through the opening of the storage compartment for securely holding a card stored in the storage compartment.

4. The case of claim 3, wherein there are two openings of the storage compartment and two protrusions of the soft protective case wherein the two openings are formed on opposite side walls of the storage compartment, and wherein the two protrusions respectively pass through the two openings for securely holding opposite sides of the card stored in the storage compartment.

5. The case of claim 3, wherein there are four openings of the storage compartment and four protrusions of the soft protective case wherein the four openings are formed on opposite side walls of the storage compartment, and wherein the four protrusions respectively pass through the four openings for securely holding opposite sides of the card stored in the storage compartment.

6. The case of claim 3, wherein the opening is formed not just on the hard side wall of the storage compartment, but also partially on the hard bottom surface of the storage compartment, wherein the protrusion of the soft protective case is constructed to snugly fit in the opening of the storage compartment.

7. The case of claim 6, wherein the opening is additionally and partially formed on a top of the side wall.

8. The case of claim 7, wherein a top side of the protrusion is in contact with the cover.

9. The case of claim 7, wherein a top side of the protrusion is substantially flush with the top of the side wall of the storage compartment.

10. The case of claim 1, wherein the storage compartment of the hard protective frame fits in the aperture of the soft protective case.

11. The case of claim 1, wherein sides of the aperture of the soft protective case substantially surround the side walls of the storage compartment.

12. The case of claim 1, further comprising a sliding means for sliding the cover forward and backward with respect to the hard protective frame.

13. The case of claim 12, wherein the sliding means comprises a pair of rails formed on the cover and a pair of rail guides formed on the hard protective frame wherein the rails are configured to slide forward and backward along the rail guides.

14. The case of claim 1, wherein the cover is a door for rotatably opening and closing the storage compartment.

15. The case of claim 1, wherein the soft protective cover is made of soft material and the hard protective frame and the cover are made of hard material.

16. The case of claim 15, wherein the soft protective cover is made of thermoplastic polyurethane and the hard protective frame and the cover are made of polycarbonate.

17. The case of claim 1, wherein the soft protective case comprises a longitudinal recess and the hard protective frame comprises a longitudinal protrusion such that the longitudinal recess of the soft protective case receives the longitudinal protrusion of the hard protective frame therein for secure coupling between the soft protective case and the hard protective frame.

18. The case of claim 1, wherein width and length of the storage compartment are respectively substantially same or slightly greater than those of a credit card so that the credit card can snugly fit in the storage compartment.

19. The case of claim 1, wherein the soft protective case is sufficiently flexible to accept insertion of the electronic device therein and sufficiently rigid to securely retain the inserted electronic device.

* * * * *